(12) United States Patent
Xia

(10) Patent No.: US 10,027,820 B2
(45) Date of Patent: Jul. 17, 2018

(54) CHARGING SYSTEM SWITCHING METHOD AND APPARATUS

(71) Applicant: Huawei Technologies Co., Ltd., Shenzhen (CN)

(72) Inventor: Xiuyan Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 70 days.

(21) Appl. No.: 15/217,524

(22) Filed: Jul. 22, 2016

(65) Prior Publication Data
US 2016/0330329 A1  Nov. 10, 2016

Related U.S. Application Data

(63) Continuation of application No. PCT/CN2014/081067, filed on Jun. 28, 2014.

(30) Foreign Application Priority Data

Jan. 24, 2014  (CN) .......................... 2014 1 0037049

(51) Int. Cl.
*H04M 11/00* (2006.01)
*H04M 15/00* (2006.01)
(Continued)

(52) U.S. Cl.
CPC ........ *H04M 15/64* (2013.01); *H04L 12/1403* (2013.01); *H04L 12/1467* (2013.01);
(Continued)

(58) Field of Classification Search
CPC ........................... H04W 4/24; H04M 2215/32
(Continued)

(56) References Cited

U.S. PATENT DOCUMENTS

| 2007/0005764 A1 | 1/2007 | Teppo |
| 2011/0170455 A1 | 7/2011 | Cai et al. |

(Continued)

FOREIGN PATENT DOCUMENTS

| CN | 101572915 A | 11/2009 |
| CN | 101800965 A | 8/2010 |

(Continued)

OTHER PUBLICATIONS

Machine Translation and Abstract of Chinese Publication No. CN102647697, Aug. 22, 2012, 12 pages.
(Continued)

*Primary Examiner* — Temica M Beamer
(74) *Attorney, Agent, or Firm* — Conley Rose, P.C.

(57) ABSTRACT

A charging system switching method and an apparatus such that an online charging system or a customer relationship management system may initiate charging system switching of a specific service, and may switch any service from an original charging system to a new charging system in real time, without switching all users on the original charging system onto the new charging system. Therefore, a smooth switching between multiple charging systems is supported, and in addition, multiple charging systems may perform charging for different services of a same user, thereby implementing coexistence of different charging systems.

16 Claims, 8 Drawing Sheets

(51) Int. Cl.
*H04W 4/24* (2018.01)
*H04L 12/14* (2006.01)
*H04L 29/06* (2006.01)

(52) U.S. Cl.
CPC ............ *H04L 63/08* (2013.01); *H04M 15/43* (2013.01); *H04M 15/61* (2013.01); *H04M 15/62* (2013.01); *H04M 15/65* (2013.01); *H04M 15/70* (2013.01); *H04W 4/24* (2013.01)

(58) Field of Classification Search
USPC .................................................. 455/406, 408
See application file for complete search history.

(56) References Cited

U.S. PATENT DOCUMENTS

| | | | |
|---|---|---|---|
| 2013/0054428 A1 | 2/2013 | Shaikh | |
| 2016/0323731 A1* | 11/2016 | Mohammed | .......... H04M 15/70 |
| 2016/0323766 A1* | 11/2016 | Mohammed | ........ H04L 12/1407 |

FOREIGN PATENT DOCUMENTS

| | | | |
|---|---|---|---|
| CN | 102113271 A | | 6/2011 |
| CN | 102647697 A | | 8/2012 |
| CN | 103517246 A | | 1/2014 |
| CN | 103532725 A | | 1/2014 |
| CN | 103841541 A | | 6/2014 |
| EP | 2219359 A1 | | 8/2010 |
| EP | 2466787 A1 | | 6/2012 |
| EP | 2509255 A1 | | 10/2012 |
| WO | 03025809 A2 | | 3/2003 |
| WO | 2009129856 A1 | | 10/2009 |

OTHER PUBLICATIONS

Machine Translation and Abstract of Chinese Publication No. CN103532725, Jan. 22, 2014, 23 pages.
Foreign Communication From a Counterpart Application, European Application No. 14880019.6, Extended European Search Report dated Mar. 3, 2017, 15 pages.
Foreign Communication From a Counterpart Application, Chinese Application No. 201410037049.4, Chinese Office Action dated Apr. 6, 2017, 8 pages.
Partial English Translation and Abstract of Chinese Patent Application No. CN103841541, dated Aug. 4, 2016, 4 pages.
Calhoun, P., et al., "Diameter Base Protocol," RFC 3588, Sep. 2003, 147 pages.
Hakala, H., et al., "Diameter Credit-Control Application," RFC 4006, Aug. 2005, 114 pages.
Foreign Communication From a Counterpart Application, Chinese Application No. 201410037049.4, Chinese Office Action dated Nov. 3, 2016, 5 pages.
Foreign Communication From a Counterpart Application, PCT Application No. PCT/CN2014/081067, English Translation of International Search Report dated Oct. 27, 2014, 2 pages.
Foreign Communication From a Counterpart Application, PCT Application No. PCT/CN2014/081067, English Translation of Written Opinion dated Oct. 27, 2014, 7 pages.

* cited by examiner

CHARGING SYSTEM SWITCHING METHOD AND APPARATUS

CROSS-REFERENCE TO RELATED APPLICATIONS

This application is a continuation of International Application No. PCT/CN2014/081067, filed on Jun. 28, 2014, which claims priority to Chinese Patent Application No. 201410037049.4, filed on Jan. 24, 2014, both of which are hereby incorporated by reference in their entireties.

TECHNICAL FIELD

The present disclosure relates to the field of communications technologies, and in particular, to a charging system switching method and an apparatus.

BACKGROUND

With respect to a current mobile communications service (for example, a data service or a call service), an operator may provide multiple different services or packages for a user to select. After a user selects a service or a package, the operator uses a charging system (for example, an online charging system (OCS)) to perform charging for the service used by the user. In order to implement precise management of user accounts by means of unified charging, a user generally belongs to a charging system. However, the charging system is related to the service or package provided by the charging system. Services or packages that can be provided by charging systems vary with capabilities of the charging systems. Consequently, services or packages available to a user are limited by capabilities of charging systems that provide services for the user. If a user needs to use a service provided by a new charging system, the user has to be switched to the new charging system before the user can use the service provided by this charging system.

For charging system switching in the prior art, cutover can only be performed once, that is, all users on an old charging system are switched onto a new charging system all at once, and subsequent charging requests of the users are completely processed by the new charging system.

Defects of this switching manner may be identified as follows. Switching generally refers to switching a user from an old charging system to a new charging system that has a higher capability, and after switching, the new charging system processes all charging requests of the user, and the two charging systems cannot perform charging for the same user. After the capability of the charging system is upgraded, all users on the old charging system are switched to the new charging system, but not all users choose to use a new service or package. For a user who still uses an original service or package, the capability of the old charging system is absolutely adequate, and a significant waste of resources is caused if the old charging system is discarded. The two defects may be summarized into one, that is, the existing charging system switching cannot implement coexistence of two charging systems.

SUMMARY

Embodiments of the present disclosure provide a charging system switching method and an apparatus to resolve a problem that existing charging system switching cannot implement coexistence of two charging systems.

According to a first aspect, a charging system switching method is provided, including determining, by an OCS, a service for which a charging system needs to be switched, and a target charging system to which the service needs to be switched, constructing, by the OCS, a re-authentication request external (RARe) session message, where the RARe session message includes a first identifier and a second identifier, the first identifier is used to indicate the service for which a charging system needs to be switched, and the second identifier is used to indicate the target charging system to which the service needs to be switched, and sending, by the OCS, the RARe session message to an access device in order to instruct the access device to switch the service from a current charging system to the target charging system according to the RARe session message.

According to a second aspect, an OCS is provided, including a determining module configured to determine a service for which a charging system needs to be switched, and a target charging system to which the service needs to be switched, a constructing module configured to construct a RARe session message on a basis that the determining module determines the service for which a charging system needs to be switched, and the target charging system to which the service needs to be switched, where the RARe session message includes a first identifier and a second identifier, the first identifier is used to indicate the service for which a charging system needs to be switched, and the second identifier is used to indicate the target charging system to which the service needs to be switched, and a sending module configured to send the RARe session message constructed by the constructing module to an access device in order to instruct the access device to switch the service from a current charging system to the target charging system according to the RARe session message.

According to a third aspect, a charging system switching method is provided, including determining, by a customer relationship management (CRM) system, a service for which a charging system needs to be switched, and a target charging system to which the service needs to be switched, constructing, by the CRM system, a charging system switching request message, where the charging system switching request message includes a first identifier and a second identifier, the first identifier is used to indicate the service for which a charging system needs to be switched, and the second identifier is used to indicate the target charging system to which the service needs to be switched, and sending, by the CRM system, the charging system switching request message to an access device in order to instruct the access device to switch the service from a current charging system to the target charging system according to the charging system switching request message.

According to a fourth aspect, a CRM system is provided, including a determining module configured to determine a service for which a charging system needs to be switched, and a target charging system to which the service needs to be switched, a constructing module configured to construct a charging system switching request message on a basis that the determining module determines the service for which a charging system needs to be switched, and the target charging system to which the service needs to be switched, where the charging system switching request message includes a first identifier and a second identifier, the first identifier is used to indicate the service for which a charging system needs to be switched, and the second identifier is used to indicate the target charging system to which the service needs to be switched, and a sending module configured to send the charging system switching request message constructed by the constructing module to an access device in order to instruct the access device to switch the service from a current charging system to the target charging system according to the charging system switching request message.

According to a fifth aspect, a charging system switching method is provided, including receiving, by an access device, a charging system switching request message, where the charging system switching request message includes a first identifier and a second identifier, the first identifier is used to indicate a service for which a charging system needs to be switched, and the second identifier is used to indicate a target charging system to which the service needs to be switched, and determining, by the access device according to the first identifier, the service for which a charging system needs to be switched, and determining, according to the second identifier, the target charging system to which the service needs to be switched, and switching, by the access device from a current charging system to the target charging system, the service for which a charging system needs to be switched.

With reference to the fifth aspect, in a first implementation manner, switching, by the access device from a current charging system to the target charging system, the service for which a charging system needs to be switched includes terminating the online charging session and establishing an online charging session of the service with the target charging system if the access device determines that an online charging session of the service exists between the access device and the current charging system.

With reference to the fifth aspect, in a second implementation manner, switching, by the access device from a current charging system to the target charging system, the service for which a charging system needs to be switched includes saving a correspondence between the service and the target charging system if the access device determines that an online charging session of the service does not exist between the access device and the current charging system, and receiving, by the access device, a connection request of the service, and sending a charging request to the target charging system.

According to a sixth aspect, an access device is provided, including a receiving module configured to receive a charging system switching request message, where the charging system switching request message includes a first identifier and a second identifier, the first identifier is used to indicate a service for which a charging system needs to be switched, and the second identifier is used to indicate a target charging system to which the service needs to be switched, a determining module configured to determine, according to the first identifier received by the receiving module, the service for which a charging system needs to be switched, and determine, according to the second identifier received by the receiving module, the target charging system to which the service needs to be switched, and a switching module configured to switch, from a current charging system to the target charging system and according to the target charging system determined by the determining module, the service for which a charging system needs to be switched.

Using the charging system switching method and the apparatus disclosed in the embodiments, any service of any user can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

It should be noted that solutions disclosed in all embodiments of the present disclosure are applicable to all services that use a Diameter protocol for charging, including but without being limited to a call service or a data service. In the following embodiments, the solutions of the present disclosure are described using a data service as an example, where the solutions of the present disclosure are also applicable to another service that uses the Diameter protocol for charging.

Figure 1:
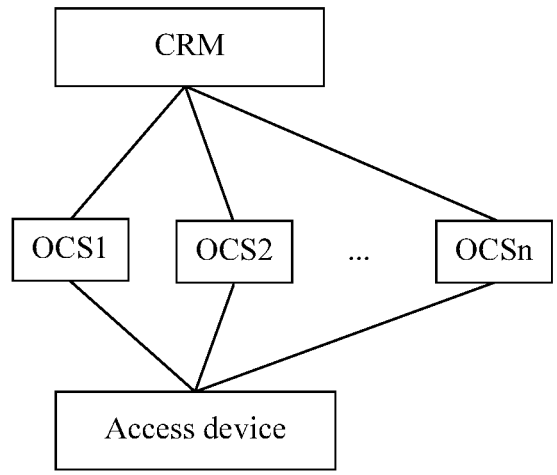
FIG. 1 is a schematic structural diagram of a system for switching a charging system according to an embodiment of the present disclosure.

FIG. 1 is a schematic structural diagram of a system for switching a charging system according to an embodiment of the present disclosure. In subsequent embodiments, the charging system switching method provided in the embodiments of the present disclosure are described in detail using this system as a basis.

The system shown in FIG. 1 includes at least two different OCSs, such as an OCS 1, an OCS 2, . . . , and an OCS n. Different OCSs can support charging for different services or packages. For example, the OCS 1 supports charging for an ordinary data service package, and does not support charging for a family quota sharing package. When a user has subscribed to a family quota sharing package on another charging system, for example, the OCS 2, because the current charging system OCS 1 does not support the charging for this package, the charging system of the user needs to be switched from the OCS 1 to the OCS 2. After the family quota sharing package of the user is used up, the charging system needs to be switched from the OCS 2 back to the OCS 1 to perform charging for the ordinary data service package of the user. In subsequent content of this embodiment of the present disclosure, the switching process will be described in detail.

As shown in FIG. 1, multiple different OCSs are connected to an access device separately, and the access device provides a service connection for a user (such as a call service or a data service) on the one hand and collaborates with the OCSs to charge the user on the other hand. In this embodiment of the present disclosure, the access device may be any of various gateway devices, for example, a gateway general packet radio service (GPRS) support node (GGSN) for the data service. It should be noted that a connection line between the OCS and the access device in FIG. 1 does not necessarily mean that the involved OCS is currently charging the user.

As shown in FIG. 1, multiple different OCSs may also be connected to a CRM system. In the telecommunications field, an operator may manage users using the CRM system, where the CRM system is used to manage subscription to a package product and activation and deactivation of a network-side service, for example, recording the package subscribed to by a user and managing changes. In this embodiment of the present disclosure, the charging system switching may be initiated by the OCS or by the CRM system. In subsequent embodiments, the two scenarios will be described in detail separately.

Based on the system shown in FIG. 1, the following embodiment discloses a detailed process of charging system switching initiated by the OCS. For example, the charging system switching initiated by the OCS may be based on the following scenario A user A has subscribed to a family quota sharing package on the OCS 2, which allows users A, B, and C to share 1 gigabyte (GB) data traffic. The charging system that currently provides a charging service for the 3 users may be the OCS 1 or may be 2 or 3 different OCSs. In this embodiment of the present disclosure, for a reason that the current charging system of the user does not support the charging for a data sharing package, or that unified charging performed by the OCS 2 for the service is more efficient, or the like, the OCS 2 may initiate charging system switching and switch the charging service of the 3 users from the OCS 1 to the OCS 2, and the OCS 2 performs charging for the family quota sharing package of the 3 users. Certainly, any of the OCSs that provide the charging service for the 3 users may initiate the charging system switching, and switch the charging for the family quota sharing package of the 3 users to the OCS 2.

In some other cases, services of some users may be switched to a new charging system for the purpose of balancing load between different charging systems. In this case, the charging system that initiates the switching, the target charging system, and the users and services for which the charging system needs to be switched may be all specified by an operator.

The switching scenarios listed above are used as examples only. In practice, the charging system switching method provided in this embodiment of the present disclosure is not limited to the two scenarios.

Figure 2:
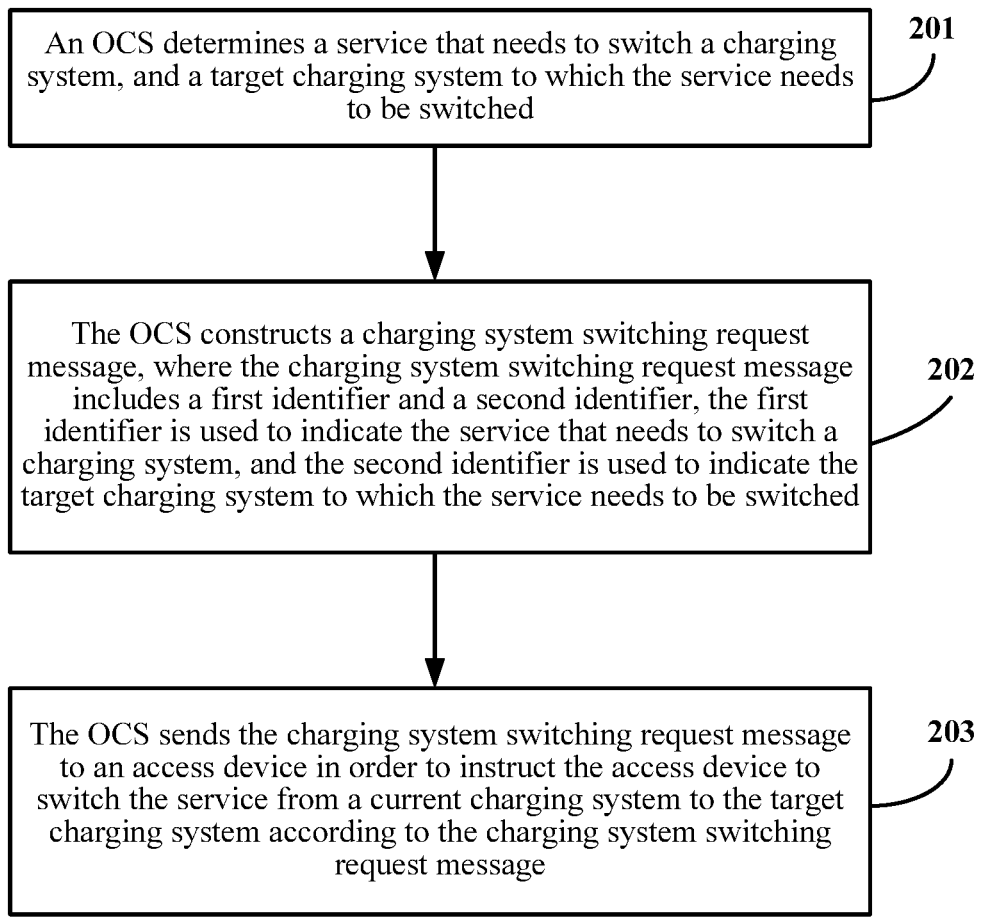
FIG. 2 is a flowchart diagram of a charging system switching method according to an embodiment of the present disclosure.

FIG. 2 is a flowchart diagram of a charging system switching method according to an embodiment of the present disclosure. Based on FIG. 2, the charging system switching method provided in this embodiment may include the following steps.

Step 201: An OCS determines a service that needs to switch a charging system, and a target charging system to which the service needs to be switched.

This embodiment of the present disclosure may involve the following charging systems (or OCSs): a charging system that currently provides a charging service for a user, hereinafter referred to briefly as a current charging system, an OCS that initiates charging system switching, hereinafter referred to briefly as an OCS that initiates switching, and a target charging system, hereinafter referred to briefly as a target charging system. The OCS that initiates switching may be the same as or different from the target charging system, and a quantity of the target charging systems is at least one. In addition, a service for which a charging system needs to be switched is hereinafter referred to briefly as a service for which switching is needed.

In this step, determining, by the OCS that initiates switching, a service for which switching is needed may include determining a user for which a charging system needs to be switched, and determining a service of the user and for which switching is needed.

Furthermore, the user for which a charging system needs to be switched may be determined according to a change of a charging manner or a load policy of the charging system.

For example in the foregoing exemplary scenario in which the OCS initiates charging system switching, users have subscribed to a family quota sharing package on the OCS 2, and the OCS 2 needs to perform charging for the family quota sharing package used by the users, and therefore, the OCS 2 may determine that the users that have subscribed to the family quota sharing package are users for which a charging system needs to be switched, and all their services need to be switched to the OCS 2.

In some other cases, services of some users may need to be switched to a new charging system on a basis of balancing load between different charging systems. In this case, the charging system that initiates switching, the target charging system, the users for which switching is needed and the services for which switching is needed may be all specified by the operator and sent to the OCS that initiates switching.

In this embodiment of the present disclosure, the service for which switching is needed may be all services belonging to a user. In this case, an overall charging service of the user is switched to the new charging system. For example, after the user subscribes to a new package, the new charging system performs charging for the new package, which is equivalent to switching an overall charging service of the user to the new charging system. In addition, the service for which switching is needed may also belong to multiple different users or may be some services of a user.

Step 202: The OCS constructs a charging system switching request message, where the charging system switching request message includes a first identifier and a second identifier, the first identifier is used to indicate the service that needs to switch a charging system, and the second identifier is used to indicate the target charging system to which the service needs to be switched.

The first identifier may be used in two cases: one case is that in step 201, the OCS determines that a charging system needs to be switched for all services of a user, and the first identifier in this case may be an identifier of the user and indicates that switching is needed for all services of the user, where the identifier of the user may be a subscription identifier (Subscription-Id), and the other case is that a charging system needs to be switched for some services of a user, and the first identifier in this case may be a service identifier, and further, a rating group (RG) commonly used in a charging standard may be used to indicate a service for which switching is needed.

For the second identifier, a combination of a realm name identifier and a node name identifier may be used to identify the target charging system. When the target charging system is same as an OCS that initiates switching, an identifier of the OCS that initiates switching may also be used to indicate the target charging system.

The following describes the first and second identifiers and the charging system switching request message in detail using examples.

Assuming that an OCS 2 is a target charging system, the charging system that initiates switching may be the OCS 2 or another charging system except the OCS 2.

In an existing charging standard and protocol, a re-authentication request (RAR) sent by the OCS is an in-session request. The OCS can send an RAR to an access device only on the premise of an online charging session between the OCS and the access device. In addition, being confined in one online charging session, the charging system that requests switching and a target charging system have to be the same OCS. If the OCS that initiates switching is different from the target OCS, or an online charging session of the service for which switching is needed does not exist between the OCS that initiates switching and the access device although the OCS that initiates switching is the same as the to-be-switched-to OCS, the RAR in the existing charging standard is no longer applicable.

To resolve such a problem, an embodiment of the present disclosure puts forward an RARe session message such that any OCS can initiate charging system switching of any service without depending on an online charging session between the OCS that initiates switching and the access device, where the to-be-switched-to charging system may be any one or more OCSs. The OCS that initiates switching sends a constructed RARe session message to the access device using a Diameter protocol.

In this embodiment of the present disclosure, the RAR is extended. An example of parameters of the obtained RARe session message is as follows:

```
<RARe> ::= <Diameter Header: 1258, REQ, PXY>
<Session-Id>
{Origin-Host}
{Origin-Realm}
{Destination-Realm}
{Destination-Host}
{Auth-Application-Id}
{Subscription-Id}
{Subscription-Id-Type}
{Subscription-Id-Data}
[Re-Auth-Information]
[Re-Auth-Destination-Realm]
[Re-Auth-Destination-Host]
[RG]
[Proxy-Info]
[Route-Record]
[AVP]
```

The following describes parameters in the foregoing message:

{Origin-Host} represents a name of an origin host, {Origin-Realm} represents a name of a realm in which the origin host is located, and the two parameters jointly identify the OCS that initiates switching, {Destination-Realm} and {Destination-Host} jointly identify the access device that receives the charging system switching request, for example, a GGSN, {Subscription-Id} is a user identifier, and [Re-Auth-Information] represents re-authentication information, which consists of three parts, where [Re-Auth-Destination-Realm] and [Re-Auth-Destination-Host] represent a realm name and a host name of a destination server respectively, and jointly identify the target charging system, and [RG] is a rating group and is used to identify the service for which switching is needed.

An RARe session message generally includes only one {Subscription-Id}. If the service for which switching is needed belongs to multiple different users, multiple RARe session messages need to be constructed.

With reference to the descriptions of the first and second identifiers, it can be seen that all the three parameters included in [Re-Auth-Information] are optional. For the first identifier, if a charging system needs to be switched for all services of a user, [RG] may be not included, and the {Subscription-Id} represents that a charging system needs to be switched for all services of the user. On the contrary, if services for which switching is needed are some services belonging to a user, [RG] needs to be included and represents that a charging system needs to be switched for the services identified by [RG]. For the second identifier, if the OCS that initiates switching is the same as the target charging system, identifiers [Re-Auth-Destination-Realm] and [Re-Auth-Destination-Host] of the target charging system may be not included. Instead, parameters {Origin-Host} and {Origin-Realm} of the OCS that initiates switching are used to identify the target charging system. On the contrary, if the OCS that initiates switching is different from the target charging system, the identifiers of the target charging system need to be included. In addition, an RARe session message may further include multiple [RG]s, and [Re-Auth-Destination-Realm]s and [Re-Auth-Destination-Host]s that are corresponding to the [RG]s, which represent that services represented by different [RG]s belonging to the same user (same {Subscription-Id}) are switched to different target charging systems separately.

Step 203: The OCS sends the charging system switching request message to an access device in order to instruct the access device to switch the service from a current charging system to the target charging system according to the charging system switching request message.

As mentioned above, the OCS that initiates switching may be the same as or different from the target charging system. In addition, considering that an online charging session of the service for which switching is needed may exist or may not exist between the OCS that initiates switching and the access device, scenarios of initiating the charging system switching by the OCS are classified into the following four types.

1) The OCS that initiates switching is different from the target charging system, and the online charging session of the service for which switching is needed does not exist between the OCS that initiates switching and the access device;

2) The OCS that initiates switching is same as the target charging system, and the online charging session of the service for which switching is needed does not exist between the OCS that initiates switching and the access device;

3) The OCS that initiates switching is different from the target charging system, and the online charging session of the service for which switching is needed exists between the OCS that initiates switching and the access device; and 4) The OCS that initiates switching is the same as the target charging system, and the online charging session of the service for which switching is needed exists between the OCS that initiates switching and the access device.

In the first two scenarios, the online charging session of the service for which switching is needed does not exist between the OCS that initiates switching and the access device, and the OCS that initiates switching may construct an RARe session message to implement charging system switching. In scenario 3), although the online charging session of the service for which switching is needed exists between the OCS that initiates switching and the access device, because the OCS that initiates switching is different from the target charging system, an existing in-session RAR message is not usable, and the OCS that initiates switching still needs to construct an RARe session message to implement charging system switching. For the process of constructing the RARe session message and detailed parameters thereof, reference may be made to content disclosed in step 202, and no repeated description is given herein again. In scenario 4), the online charging session of the service for which switching is needed exists between the OCS that initiates switching and the access device, and the OCS that initiates switching is same as the target charging system. In this case, the charging system switching may be implemented using the RARe session message provided in this embodiment or using the foregoing in-session RAR.

After receiving the charging system switching request message sent by the OCS (when the message is sent by the OCS, the charging system switching request message may also be the RARe session message), the access device performs an operation of switching a charging system as instructed by the message, details of which will be disclosed in subsequent embodiments.

Using the charging system switching method disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

Based on the system shown in FIG. 1, the following embodiment discloses a process of charging system switching initiated by a CRM system. For example, the charging system switching may be initiated by the CRM system in the following scenario.

A user has subscribed to a new service package using a CRM system. A current charging system of the user cannot provide a charging service for the package, but a new charging system is required to provide the charging service. In this case, the CRM system may initiate charging system switching, and a charging system switching request message may be used to instruct an access device to implement the charging system switching.

Figure 3:
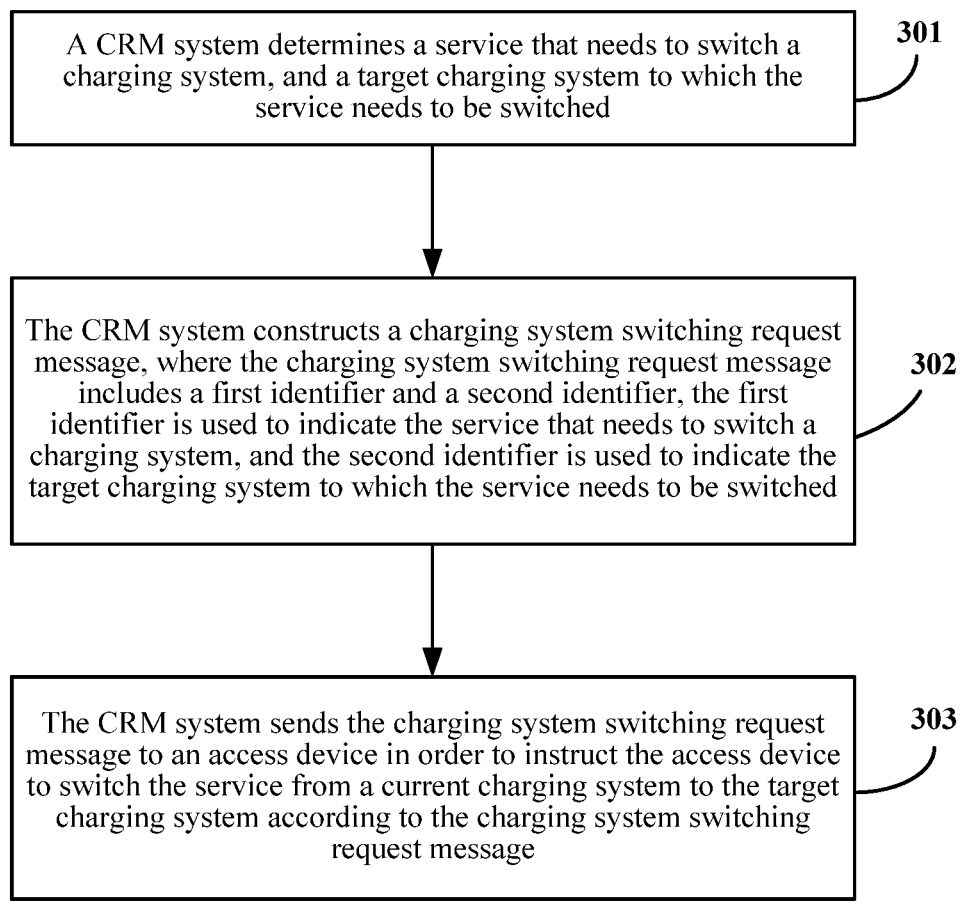
FIG. 3 is a flowchart diagram of a charging system switching method according to another embodiment of the present disclosure.

FIG. 3 is a flowchart diagram of a charging system switching method according to another embodiment of the present disclosure. Based on FIG. 3, the charging system switching method provided in this embodiment may include the following steps.

Step 301: A CRM system determines a service that needs to switch a charging system, and a target charging system to which the service needs to be switched.

In this step, that a CRM system determines a service for which a charging system needs to be switched may include determining, by the CRM system, a user for which a charging system needs to be switched, and determining a service that is of the user and for which switching is needed.

Furthermore, the user for which a charging system needs to be switched may be determined according to a change of a charging manner or a load policy of the charging system.

For example after the user subscribes to a new service package using the CRM system, a new charging system is required to provide the charging service, and then the CRM system can determine that users that have subscribed to a family quota sharing package are users for which a charging system needs to be switched, and all services of the users need to be switched to the new charging system.

In some other cases, services of some users may need to be switched to a new charging system on a basis of balancing load between different charging systems. In this case, the target charging system, the users for which switching is needed and the services for which switching is needed may be all specified by an operator and sent to the CRM system that initiates switching.

In this embodiment of the present disclosure, the service for which switching is needed may be all services belonging to a user. In this case, an overall charging service of the user is switched to the new charging system. For example, after the user subscribes to a new package, the new charging system performs charging for the new package. In addition, the service for which switching is needed may also belong to multiple different users or may be some services of a user.

Step 302: The CRM system constructs a charging system switching request message, where the charging system switching request message includes a first identifier and a second identifier, the first identifier is used to indicate the service that needs to switch a charging system, and the second identifier is used to indicate the target charging system to which the service needs to be switched.

It should be noted that the first identifier may be used in two cases: one case is that in step 301, the CRM system determines that a charging system needs to be switched for all services of a user, and the first identifier in this case may be an identifier of the user and indicates that switching is needed for all services of the user, where the identifier of the user may be a Subscription-Id, and the other case is that a charging system needs to be switched for some services of a user, and the first identifier in this case may be an RG that indicates the service for which switching is needed.

In this embodiment, the charging system switching request message constructed by the CRM system may be a web service request, or may be a request over another protocol so long as the request is supported by both the CRM system and the access device. In this embodiment, a web service request is used as an example for description.

Information carried in the web service request is the same as information carried in the RARe session message sent by the OCS, except that bearer protocols and manners are different. For detailed content, reference may be made to the examples of parameters of the RARe session message disclosed in step 202. The web service request constructed by the CRM system also needs to include the same parameters, which are not repeated herein again.

Step 303: The CRM system sends the charging system switching request message to the access device in order to instruct the access device to switch the service from a current charging system to the target charging system according to the charging system switching request message.

After receiving the charging system switching request message sent by the CRM system, the access device performs an operation of switching a charging system as instructed by the message, details of which will be disclosed in subsequent embodiments.

Using the charging system switching method disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

Figure 4:
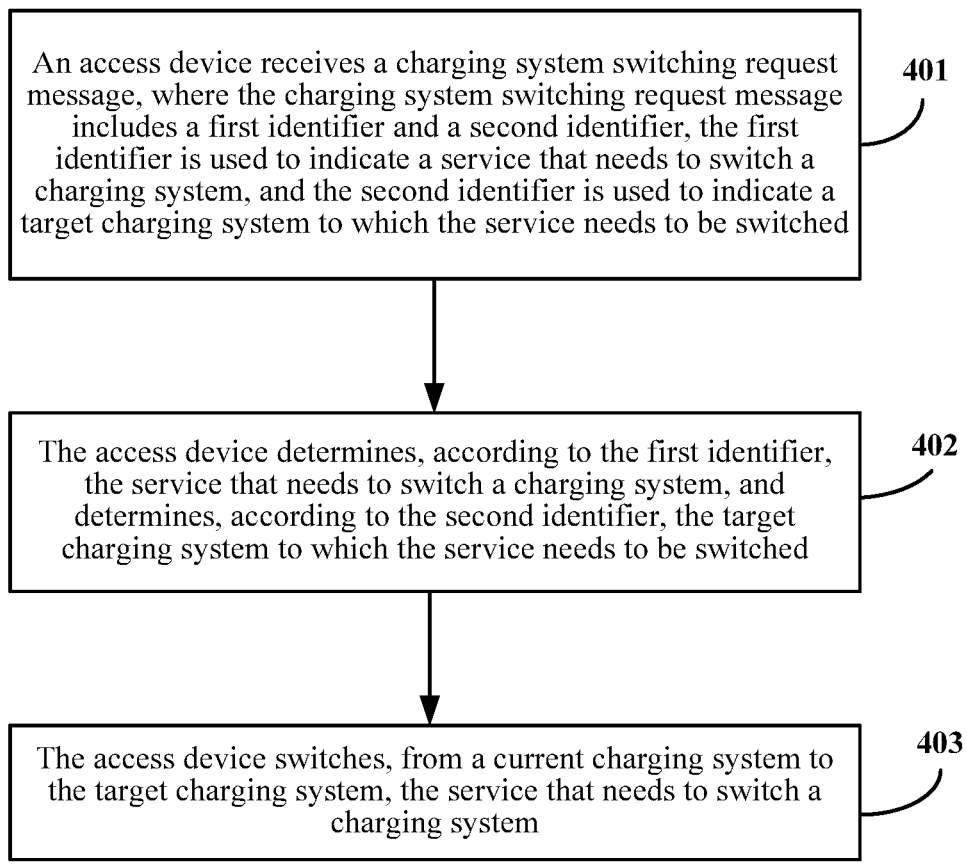
FIG. 4 is a flowchart diagram of a charging system switching method according to another embodiment of the present disclosure.

Based on the system shown in FIG. 1, FIG. 4 is a flowchart diagram of a charging system switching method according to another embodiment of the present disclosure. Based on FIG. 4, the charging system switching method provided in this embodiment may include the following steps.

Step 401: An access device receives a charging system switching request message, where the charging system switching request message includes a first identifier and a second identifier, the first identifier is used to indicate a service that needs to switch a charging system, and the second identifier is used to indicate a target charging system to which the service needs to be switched.

The access device may be any of various gateway devices, for example, a GGSN for a data service, and the charging system switching request message may be sent by a CRM system or an OCS. A charging system switching request constructed by the OCS may be an RARe session message, and a charging system switching request message constructed by the CRM system may be a web service request. The process of constructing a charging system switching request message and sending the message to the access device by the CRM system or the OCS has been disclosed in detail in the foregoing embodiments, and is not repeated herein again.

Step 402: The access device determines, according to the first identifier, the service that needs to switch a charging system, and determines, according to the second identifier, the target charging system to which the service needs to be switched.

The first identifier may include an identifier of a user, and determining, by the access device according to the first identifier, the service for which a charging system needs to be switched in this step may include determining, by the access device, whether the first identifier further includes an identifier of the service for which switching is needed, and determining, by the access device according to the identifier, the service for which switching is needed if the access device determines that the first identifier further includes the identifier of the service for which switching is needed, or determining, by the access device according to the identifier of the user, that all services of the user are services for which switching is needed if the access device determines that the first identifier does not include the identifier of the service for which switching is needed.

According to the description of the first identifier in the foregoing embodiment, it can be learned that if the OCS or the CRM system determines that a charging system needs to be switched for all services of a user, the first identifier may be an identifier of the user. The first identifier may be identifiers of the services for which switching is needed if a charging system needs to be switched for some services of a user. In this embodiment, the access device may determine that a charging system needs to be switched for all services of the user when the access device determines, according to the first identifier, the service for which switching is needed, if finding that only a user identifier is included. The access device may determine that a charging system needs to be switched for a service corresponding to the service identifier if finding that a service identifier is also included.

When the OCS sends the charging system switching request message, the second identifier includes an identifier of the OCS that initiates switching. In this step, that the access device determines, according to the second identifier, the target charging system to which the service needs to be switched includes determining, by the access device, whether the second identifier further includes an identifier of the target charging system, and determining, by the access device according to the identifier of the target charging system, the target charging system to which the service needs to be switched if the second identifier further includes the identifier of the target charging system, or determining, by the access device according to the identifier of the OCS that initiates switching, that the target charging system to which the service needs to be switched is the OCS that initiates switching if the second identifier does not include the identifier of the target charging system.

According to the description of the second identifier in the foregoing embodiment, it can be learned that if the OCS that initiates switching is the same as the target charging system, the second identifier may be the identifier of the OCS that initiates switching. The second identifier may be the identifier of the target charging system if the OCS that initiates switching is different from the target charging system. In this embodiment, determining is based on the same logic when the access device determines the target charging system according to the second identifier.

Step 403: The access device switches, from a current charging system to the target charging system, the service that needs to switch a charging system.

In an optional implementation manner, step 403 may include terminating the online charging session and re-establishing an online charging session of the service for which switching is needed with the target charging system if the access device determines that an online charging session of the service for which switching is needed exists between the access device and the current charging system.

As already disclosed in the foregoing step 202, an RARe session message (it is the same case for the charging system switching request message constructed by the CRM system) may include multiple RGs and their respective target charging systems. For this scenario, the access device needs to separately terminate online charging sessions of multiple services for which switching is needed, and re-establish an online charging session with their respective target charging systems.

In this case, after switching the service for which switching is needed from the current charging system to the target charging system, the access device may save a correspondence between the service for which switching is needed and the target charging system. In this way, after receiving a connection request of the service again, the access device may establish an online charging session of the service for which switching is needed with the target charging system according to the saved correspondence between the service for which switching is needed and the target charging system.

In the implementation of terminating, by the access device, the online charging session of the service for which switching is needed between the access device and the current charging system, the access device may send an online charging session terminating message to the current charging system. The message may further include information about a volume of services that have been used by the user (used traffic or duration) such that the current charging system saves the volume of the services that have been used by the user, for subsequent settlement on an account of the user.

In another embodiment, after terminating an online charging session of the service for which switching is needed, the access device may further keep a network connection of the service in order to ensure that the service connection is not interrupted during the charging system switching and that no adverse effects are generated on user experience. Using the GGSN as an example of the access device, for a specific service, the GGSN keeps a network connection and a charging connection of the service, where the network connection is embodied by a connection between the GGSN and a serving GPRS support node (SGSN), and the charging connection is embodied by a connection between the GGSN and the OCS. In this embodiment of the present disclosure, the network connection of the service is differentiated from the charging connection, and the network connection is kept while the charging connection is disconnected. That is, the connection is kept between the GGSN and the SGSN for the service for which switching is needed such that a network connection of the user is kept during the charging system switching.

In another optional implementation manner, step 403 may include saving a correspondence between the service for which switching is needed and the target charging system if the access device determines that an online charging session of the service for which switching is needed does not exist between the access device and the current charging system.

The saving the correspondence between the service for which switching is needed and the target charging system may be saving the identifier of the service for which switching is needed and the identifier of the target charging system correspondingly according to the charging system switching request message. In a case in which multiple groups of services for which switching is needed and corresponding target charging systems are included, the access device may group the services and save them correspondingly.

After saving the correspondence between the service for which switching is needed and the target charging system, the access device may send a charging request to the target charging system such that the target charging system performs charging for the service when receiving a connection request of the service for which switching is needed.

After receiving the service connection request, the access device determines, according to the identifier of the service, whether a target charging system corresponding to the service is saved, and determines the target charging system corresponding to the service and sends a charging request to the target charging system such that the target charging system performs charging for the service if the target charging system is saved.

Using the charging system switching method disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

Figure 5:
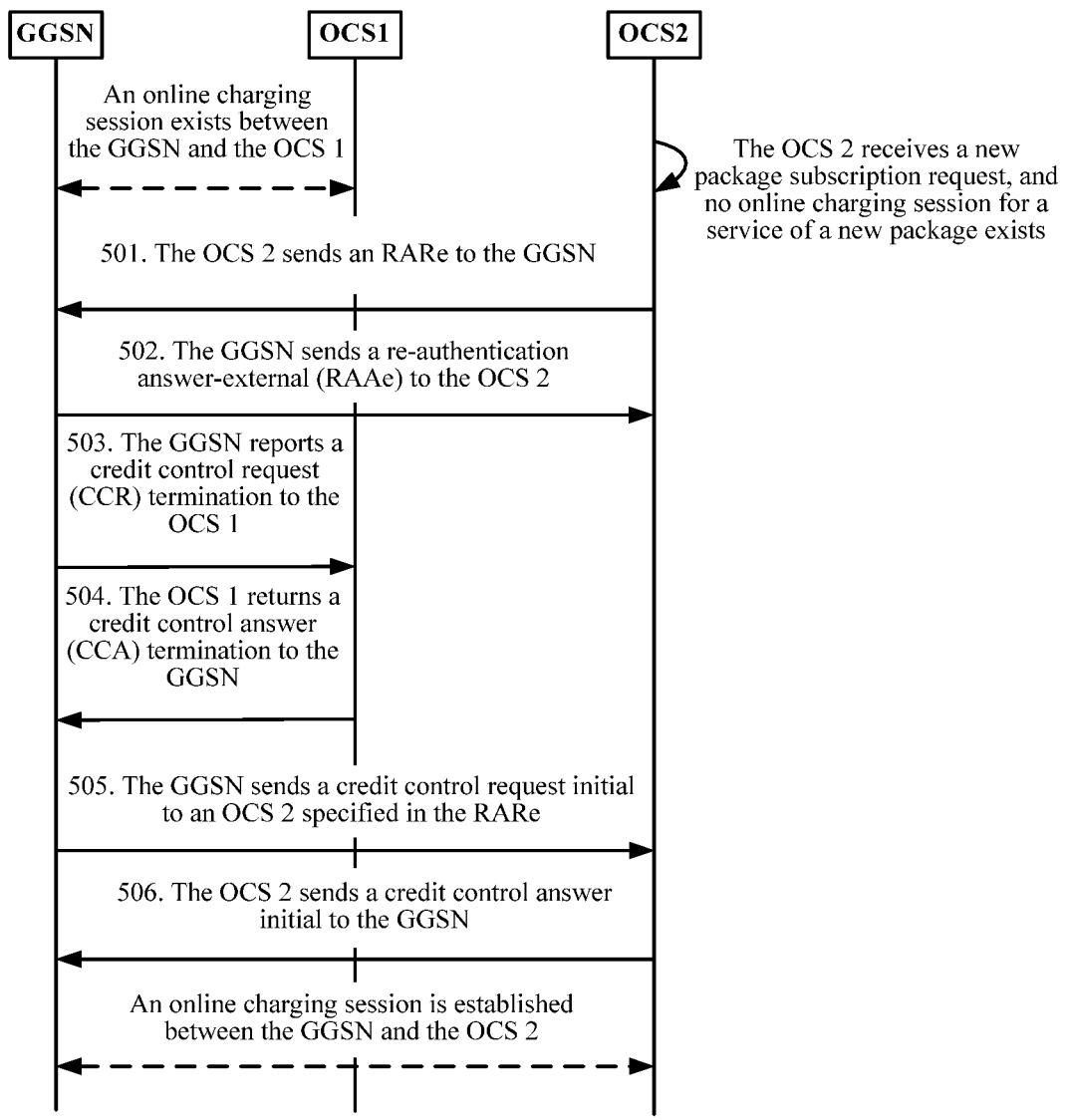
FIG. 5 is a signaling flowchart of a charging system switching method according to an embodiment of the present disclosure.

FIG. 5 is a signaling flowchart of a charging system switching method according to an embodiment of the present disclosure. In this embodiment, a new RARe session is defined, and the RARe session may be sent by an OCS to an access device. The access device may be, for example, a GGSN. An OCS 1 is a charging system that currently provides a charging service for users A, B, and C. An OCS 2 is a target charging system and can provide a family quota sharing package (for example, sharing 1 GB data traffic) to support the users A, B, and C to use one package, which is not supported by the OCS 1. After an operation of subscribing to the family quota sharing package of the users A, B, and C is complete, the OCS 2 may send 3 RARe session messages to the GGSN to request switching of the charging service of the 3 users from the OCS 1 to the OCS 2.

The signaling process shown in FIG. 5 is based on a precondition that an online charging session of a service for which switching is needed exists between the GGSN and the OCS 1. Certainly, it is possible that the online charging session of the service for which switching is needed does not exist between the GGSN and the OCS 1. Differences between the two cases will be described in the subsequent description of the signaling process.

As shown in FIG. 5, the charging system switching method in this embodiment may include the following steps.

Step 501: An OCS 2 sends a RARe session message to a GGSN to request switching of a charging service of users A, B, and C to the OCS 2.

Before switching, the OCS 2 does not provide a charging service for the 3 users, and therefore, online charging sessions of the 3 users do not exist. It should be noted that switching between two charging systems is not limited to the foregoing case, and the method and the signaling process disclosed in this embodiment are applicable regardless of the precondition on which the initiation of the charging system switching is based.

Based on the description in the foregoing step 203, it can be learned that there are three scenarios in which the charging system constructs a RARe session message to initiate charging system switching. In this embodiment, the charging system that initiates switching is same as the target charging system, and both are the OCS 2, and the online charging session of the service for which switching is needed does not exist between the OCS 2 and the GGSN, which belongs to scenario 2).

The other two scenarios differ from the scenario in this embodiment in that the charging system that initiates switching is different from the target charging system. Regardless of the scenario, examples of parameters of the RARe session message constructed by the charging system are detailed in step 202, and are not repeated herein again.

No matter whether the charging system that initiates switching is same as the target charging system or not, only difference in the signaling process of the charging system switching is that the GGSN switches, as instructed by the RARe session message, the charging service of the service for which switching is needed, to the charging system that initiates switching or a new charging system.

Step 502: The GGSN returns a re-authentication answer-external (RAAe) message to the OCS 2.

Parameters of the RAAe message may be shown as follows:

```
<RAAe> ::= <Diameter Header: 1258, PXY>
<Session-Id>
{Result-Code}
{Origin-Host}
{Origin-Realm}
[Proxy-Info]
[AVP]
```

Step 503: The GGSN reports a credit control request (CCR) termination message to an OCS 1.

If an online charging session of the user A, B, or C exists between the GGSN and the OCS 1, the GGSN reports the CCR termination to the OCS 1 to terminate the online charging session between the GGSN and the OCS 1. While terminating the online charging session, the GGSN may keep a packet data protocol (PDP) connection on the user side such that the network connection of the user is not interrupted. The CCR termination is a form of a message for terminating the online charging session, and the CCR termination may further include the volume of services used in the OCS 1.

In an optional implementation manner, if no online charging session related to the users A, B, and C exists between the GGSN and the OCS 1, the GGSN only needs to correspondingly save a user identifier, an OCS 2 identifier, and a service identifier (if existent) carried in the RARe session message sent by the OCS 2. Subsequently, charging requests of such services may be sent to the OCS 2 directly in order to finish the charging system switching of the users when service connection requests of the 3 users are received.

Step 504: The OCS 1 returns a credit control answer (CCA) termination message to the GGSN.

After receiving the CCR termination message sent by the GGSN, the OCS 1 terminates the online charging sessions of the users A, B, and C, and performs accounting processing for the users A, B, and C according to the volume of used services included in the message. Then, the OCS 1 returns the CCA termination message to the GGSN, indicating that the online charging sessions of the three users are terminated.

Step 505: The GGSN sends a credit control request initial message to the OCS 2 specified in the RARe session message.

In this embodiment, both the charging system that initiates switching and the target charging system are the OCS 2. In some other embodiments, the charging system that initiates switching may be different from the target charging system. For the charging system that initiates switching, any target charging system different from the charging system that initiates switching may be specified in the RARe session message constructed by the charging system that initiates switching (if the charging system that initiates switching is the same as the target charging system, the target charging system does not need to be specified in the RARe session message). For the GGSN, the charging service of the service needs only to be switched to the target charging system specified in the RARe session message.

Step 506: The OCS 2 processes the credit control request initial, and returns a credit control answer initial message to the GGSN.

The GGSN and the OCS 2 establish online charging sessions of the users A, B, and C to finish the charging system switching.

After the charging service of the users A, B, and C is switched to the OCS 2, the OCS 2 performs charging for the family quota sharing package of the users. When the package is used up (for example, a data sharing package of 1 GB is used up), the charging system should be switched back to the original charging system OCS 1. The switchback of the charging system may be initiated by the OCS 2 or initiated by the OCS 1.

After the OCS 2 detects that the family quota sharing package of the users is used up, the OCS 2 may initiate switchback of the charging system. In this case, an online charging session exists between the OCS 2 and the GGSN, and the target charging system OCS 1 is different from the charging system OCS 2 that initiates switching, which is scenario 3) in the four scenarios summarized in the foregoing step 203.

In another optional implementation manner, after detecting that the family quota sharing package of the users is used up, the OCS 2 may further send a notification to the OCS 1, and the OCS 1 initiates switchback of the charging system. In this case, the online charging session does not exist between the OCS 1 and the GGSN, and the target charging system is the same as the charging system that initiates switching, and both are the OCS 1, which is scenario 2) in the four scenarios summarized in the foregoing step 203.

From the summarization in the foregoing step 203, it can be learned that in the scenarios 2) and 3), the OCS that initiates switching needs to construct a RARe session message and sends the message to the GGSN in order to implement charging system switching. For a signaling process of switching in the two scenarios, reference may be made to FIG. 5 and the process description corresponding to FIG. 5, and no repeated description is given herein again.

Using the charging system switching method disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems. In addition, a network connection of the service is not interrupted when an online charging session between an access device and a current charging system is disconnected, which can ensure continuity of the service used by the user.

Figure 6:
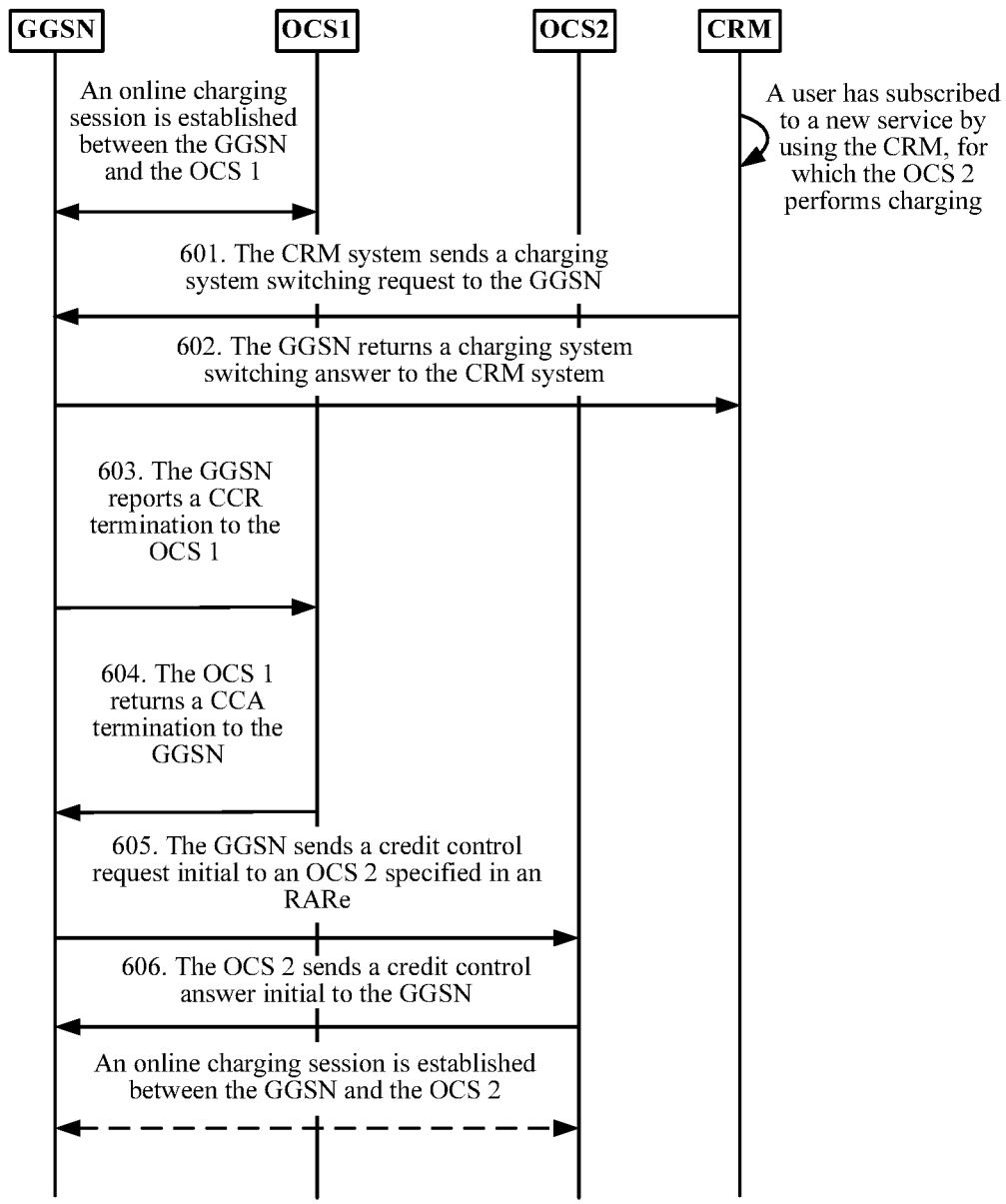
FIG. 6 is a signaling flowchart of a charging system switching method according to another embodiment of the present disclosure.

FIG. 6 is a signaling flowchart of a charging system switching method according to another embodiment of the present disclosure. Different from the embodiment shown in FIG. 5, charging system switching in this embodiment may be initiated by a CRM system. An access device in this embodiment may be a GGSN, an OCS 1 is a current charging system, and an OCS 2 is a target charging system.

The signaling process shown in FIG. 6 is based on a precondition that an online charging session of a service for which switching is needed exists between the GGSN and the OCS 1. Certainly, it is possible that the online charging session of the service for which switching is needed does not exist between the GGSN and the OCS 1. Differences between the two cases will be described in the subsequent description of the signaling process.

The OCS 1 is a charging system that provides a charging service for users A, B, and C. The OCS 2 is a target charging system, and can provide a family quota sharing package to support the users A, B, and C to use one package, which is not supported by the OCS 1. After any of the users A, B, and C subscribes to the family quota sharing package (for example, the 3 users share 1 GB data traffic) using the CRM system, the CRM system may initiate charging system switching, and switch a charging service of the three users from the OCS 1 to the OCS 2. It should be noted that switching between two charging systems is not limited to the foregoing case, and the method and the signaling process disclosed in this embodiment are applicable regardless of the precondition on which the initiation of the charging system switching is based.

Based on the foregoing content, the charging system switching method shown in FIG. 6 may include the following steps.

Step 601: A CRM system constructs a charging system switching request message and sends the message to a GGSN.

The charging system switching request message constructed by the CRM system may be carried using a web service protocol. Certainly, the message may also be carried using any protocol supported by both the CRM system and the GGSN, which is not limited in this embodiment of the present disclosure.

No matter which type of protocol is used to carry the charging system switching request message, parameters that need to be carried are the same, for example, a user identifier, an identifier of a service for which switching is needed, and an identifier of a target charging system. For details about the parameters added by the CRM system to the charging system switching request message, reference may be made to the content in the embodiment in FIG. 3, and no repeated description is given in this embodiment again.

Step 602: The GGSN returns a charging system switching answer to the CRM system.

Using the protocol used by the CRM system to send the charging system switching request message to the GGSN, the GGSN returns the charging system switching answer message to the CRM system.

Steps 603 to 606 are the same as the foregoing steps 503 to 506. For detailed content, reference may be made to steps 503 to 506 in the previous embodiment and no repeated description is given herein again.

After the step 606 is performed, the online charging sessions of the users A, B, and C are established between the GGSN and the OCS 2, and the charging system switching is completed.

After the charging service of the users A, B, and C is switched to the OCS 2, the OCS 2 performs charging for the family quota sharing package of the users. When the package is used up (for example, a data sharing package of 1 GB is used up), the charging system should be switched back to the original charging system OCS 1. The OCS 2 may notify the CRM system that the package is used up, and the CRM system initiates switching so that the charging service of related users is switched from the OCS 2 back to the OCS 1. For a switching process, reference may be made to the foregoing steps 601 to 606, and no repeated description is given herein again.

Using the charging system switching method disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems. In addition, a network connection of the service is not interrupted when an online charging session between an access device and a current charging system is disconnected, which can ensure continuity of the service used by the user.

The following embodiment describes an apparatus involved in charging system switching, where the apparatus is used to implement a charging system switching method disclosed in the foregoing embodiment.

Figure 7:
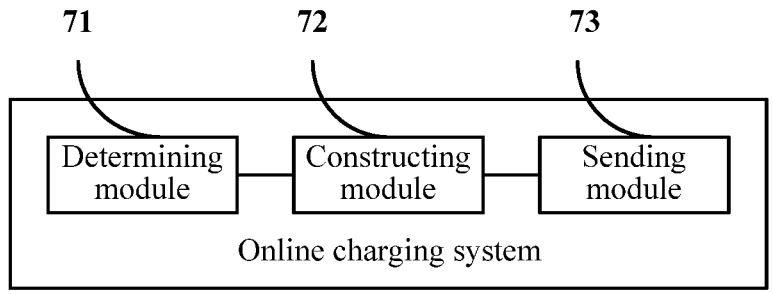
FIG. 7 is a schematic structural diagram of an online charging system according to an embodiment of the present disclosure.

FIG. 7 is a schematic structural diagram of an online charging system according to an embodiment of the present disclosure. As shown in FIG. 7, the OCS includes a determining module 71 configured to determine a service for which a charging system needs to be switched, and a target charging system to which the service needs to be switched, a constructing module 72 configured to construct a charging system switching request message on a basis that the determining module 71 determines the service for which a charging system needs to be switched, and the target charging system to which the service needs to be switched, where the charging system switching request message includes a first identifier and a second identifier, the first identifier is used to indicate the service for which a charging system needs to be switched, and the second identifier is used to indicate the target charging system to which the service needs to be switched, and a sending module 73 configured to send the charging system switching request message constructed by the constructing module 72 to an access device in order to instruct the access device to switch the service from a current charging system to the target charging system according to the charging system switching request message.

Optionally, the determining module 71 is configured to determine a user for which a charging system needs to be switched, and determine a service that is of the user and for which a charging system needs to be switched.

Optionally, if the determining module 71 determines that a charging system needs to be switched for all services of the user, the first identifier is an identifier of the user.

Optionally, if the determining module 71 determines that no online charging session of the service exists between the OCS and the access device, and the OCS and the target charging system are a same charging system, the second identifier is an identifier of the OCS.

For implementation manners of the foregoing modules, reference may be made to the related description in the embodiment shown in FIG. 2, and no repeated description is given herein again.

Figure 8:
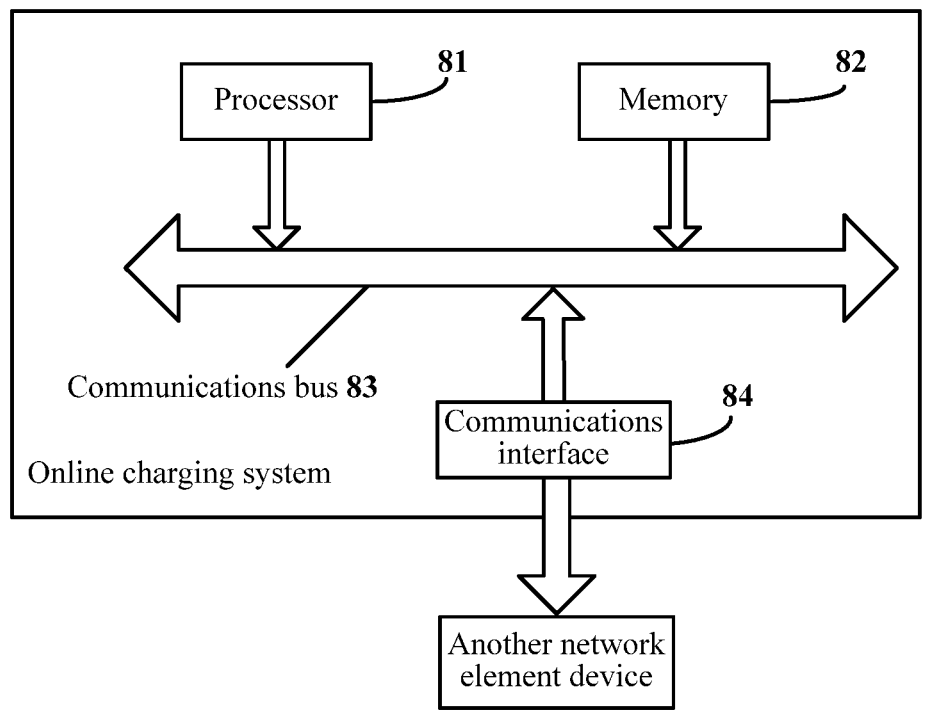
FIG. 8 is a schematic structural diagram of an online charging system according to another embodiment of the present disclosure.

FIG. 8 is a schematic structural diagram of an online charging system according to another embodiment of the present disclosure. As shown in FIG. 8, the OCS includes a processor 81, a memory 82, and a communications bus 83, where the processor 81 is connected to the memory 82 using the communications bus 83. The OCS shown in FIG. 8 may further include a communications interface 84, and communicate with another network element device (such as an access device or a CRM system) using the communications interface 84.

The memory 82 stores a corresponding instruction for implementing a charging system switching method. When the processor 81 fetches the instruction stored in the memory 82, the following steps may be performed: determining a service for which a charging system needs to be switched, and a target charging system to which the service needs to be switched, constructing a charging system switching request message, where the charging system switching request message includes a first identifier and a second identifier, the first identifier is used to indicate the service for which a charging system needs to be switched, and the second identifier is used to indicate the target charging system to which the service needs to be switched, and sending the charging system switching request message to an access device in order to instruct the access device to switch the service for which switching is needed from a current charging system to the target charging system according to the charging system switching request message. More detailed content of the corresponding steps performed when the processor 81 reads the instruction stored in the memory 82 has been described in FIG. 2 and the corresponding steps 201 to 203, and is not repeated herein again.

Using the OCS disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

Figure 9:
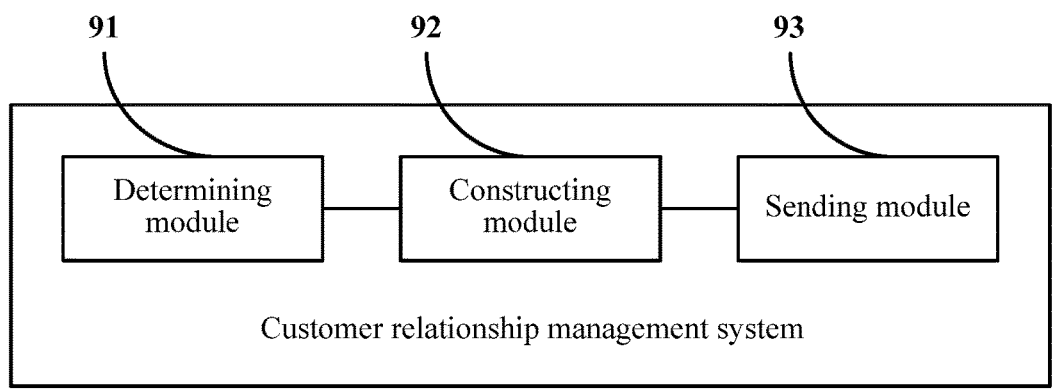
FIG. 9 is a schematic structural diagram of a customer relationship management system according to an embodiment of the present disclosure.

FIG. 9 is a schematic structural diagram of a CRM system according to an embodiment of the present disclosure. As shown in FIG. 9, the CRM system includes a determining module 91 configured to determine a service for which a charging system needs to be switched, and a target charging system to which the service needs to be switched, a constructing module 92 configured to construct a charging system switching request message on a basis that the determining module 91 determines the service for which a charging system needs to be switched, and the target charging system to which the service needs to be switched, where the charging system switching request message includes a first identifier and a second identifier, the first identifier is used to indicate the service for which switching is needed, and the second identifier is used to indicate the target charging system to which the service needs to be switched, and a sending module 93 configured to send the charging system switching request message constructed by the constructing module 92 to an access device in order to instruct the access device to switch, from a current charging system to the target charging system and according to the charging system switching request message, the service for which switching is needed.

Optionally, the determining module 91 is configured to determine a user for which a charging system needs to be switched, and determine a service that is of the user and for which a charging system needs to be switched.

Optionally, the first identifier is an identifier of the user if the determining module 91 determines that a charging system needs to be switched for all services of the user.

For implementation manners of the foregoing modules, reference may be made to the related description in the embodiment shown in FIG. 3, and no repeated description is given herein again.

Figure 10:
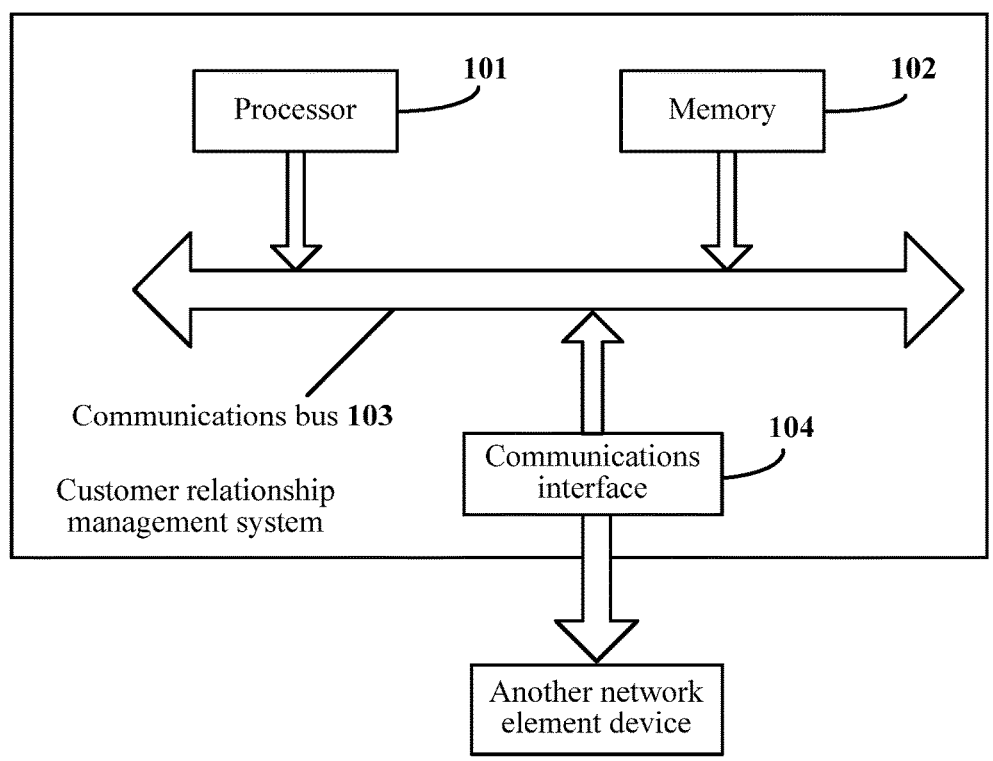
FIG. 10 is a schematic structural diagram of a customer relationship management system according to another embodiment of the present disclosure.

FIG. 10 is a schematic structural diagram of a CRM system according to another embodiment of the present disclosure. As shown in FIG. 10, the CRM system includes a processor 101, a memory 102, and a communications bus 103, where the processor 101 is connected to the memory 102 using the communications bus 103. The CRM system may further include a communications interface 104, and the CRM system may communicate with another network element device (such as an access device) using the communications interface 104.

The memory 102 stores a corresponding instruction for implementing a charging system switching method. When the processor 101 fetches the instruction stored in the memory 102, the following steps may be performed: determining a service for which a charging system needs to be switched, and a target charging system to which the service needs to be switched, constructing a charging system switching request message, where the charging system switching request message includes a first identifier and a second identifier, the first identifier is used to indicate the service for which a charging system needs to be switched, and the second identifier is used to indicate the target charging system to which the service needs to be switched, and sending the charging system switching request message to an access device in order to instruct the access device to switch the service from a current charging system to the target charging system according to the charging system switching request message.

More detailed content of the corresponding steps performed when the processor 101 reads the instruction stored in the memory 102 has been described in FIG. 3 and the corresponding steps 301 to 303, and is not repeated herein again.

Using the CRM system disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

Figure 11:
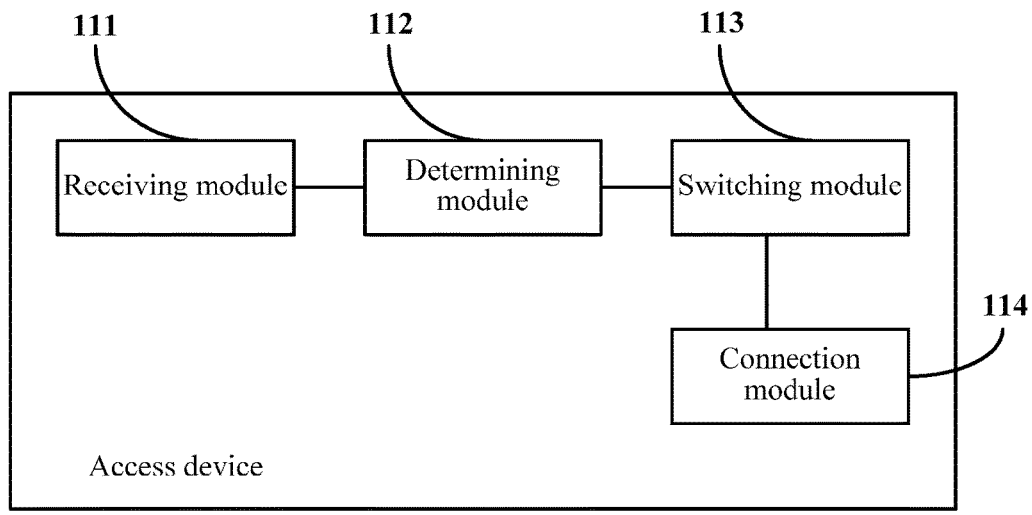
FIG. 11 is a schematic structural diagram of an access device according to an embodiment of the present disclosure.

FIG. 11 is a schematic structural diagram of an access device according to an embodiment of the present disclosure. As shown in FIG. 11, the access device includes a receiving module 111 configured to receive a charging system switching request message, where the charging system switching request message includes a first identifier and a second identifier, the first identifier is used to indicate a service for which a charging system needs to be switched, and the second identifier is used to indicate a target charging system to which the service needs to be switched, a determining module 112 configured to determine, according to the first identifier received by the receiving module 111, the service for which a charging system needs to be switched, and determine, according to the second identifier received by the receiving module 111, the target charging system to which the service needs to be switched, and a switching module 113 configured to switch, from a current charging system to the target charging system and according to the target charging system determined by the determining module 112, the service for which switching is needed.

Optionally, the first identifier includes an identifier of a user, and the determining module 112 is configured to determine whether the first identifier further includes an identifier of the service, and determine, according to the identifier of the service, the service for which a charging system needs to be switched if the first identifier further includes the identifier of the service, or determine, according to the identifier of the user, that all services of the user are services for which a charging system needs to be switched if the first identifier does not include the identifier of the service.

Optionally, the charging system switching request message is sent by a CRM system or an OCS.

Optionally, the second identifier is an identifier of an OCS that initiates switching if no online charging session of the service exists between the access device and the OCS that initiates switching, and the OCS that initiates switching and the target charging system are a same charging system, or the second identifier is an identifier of the target charging system if an online charging session of the service for which switching is needed exists between the access device and an OCS that initiates switching, and the OCS that initiates switching is different from the target charging system.

Optionally, the determining module 112 is further configured to determine, according to the identifier of the target charging system, the target charging system to which the service needs to be switched if the second identifier is an identifier of the target charging system, or determine, according to the identifier of the OCS that initiates switching, the target charging system to which the service needs to be switched if the second identifier is an identifier of an OCS that initiates switching.

Optionally, the switching module 113 is configured to terminate the online charging session and establish an online charging session of the service for which switching is needed with the target charging system if an online charging session of the service for which switching is needed exists between the access device and the current charging system.

Optionally, the access device provided in this embodiment of the present disclosure may further include a connection module 114 configured to keep a network connection of the service for which switching is needed when the switching module 113 switches, from a current charging system to the target charging system, the service for which a charging system needs to be switched.

In another embodiment, the switching module 113 is configured to save a correspondence between the service for which switching is needed and the target charging system if it is determined that an online charging session of the service for which switching is needed does not exist between the access device and the current charging system, and send a charging request to the target charging system after receiving a connection request of the service for which switching is needed.

For implementation manners of the foregoing modules, reference may be made to the related description in the embodiment shown in FIG. 4, and no repeated description is given herein again.

Figure 12:
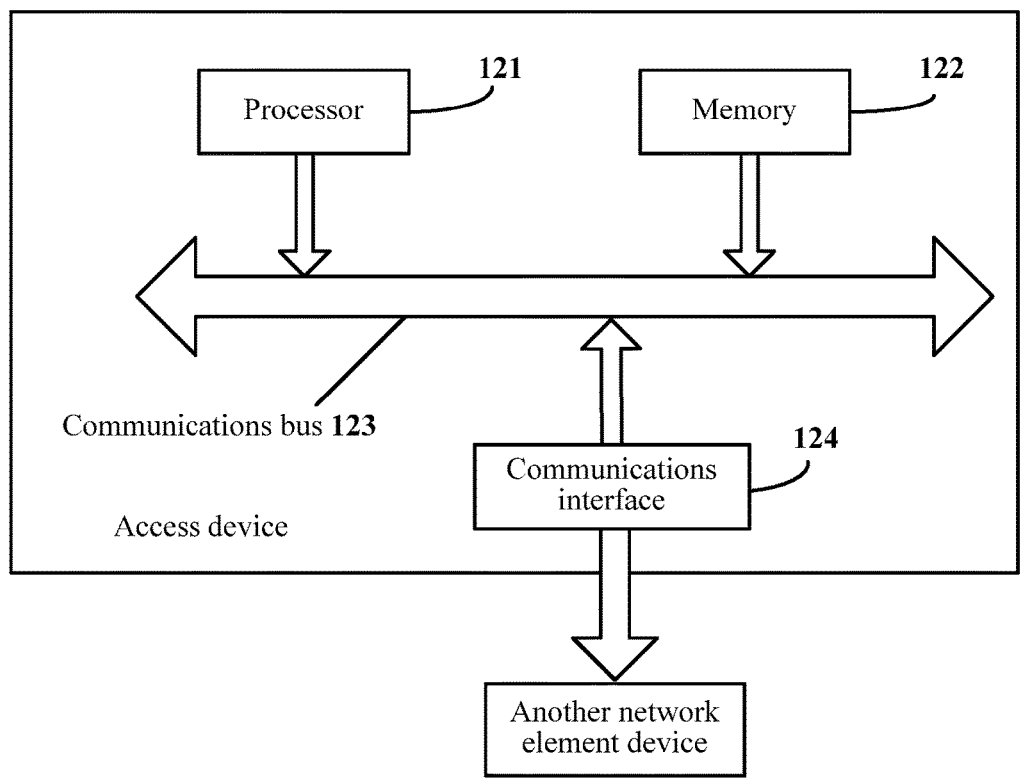
FIG. 12 is a schematic structural diagram of an access device according to another embodiment of the present disclosure.

FIG. 12 is a schematic structural diagram of an access device according to another embodiment of the present disclosure. As shown in FIG. 12, the access device includes a processor 121, a memory 122, and a communications bus 123, where the processor 121 is connected to the memory 122 using the communications bus 123. Further, the access device may further include a communications interface 124, and the access device may communicate with another network element device (such as an OCS) using the communications interface 124.

The memory 122 stores a corresponding instruction for implementing a charging system switching method. When the processor 121 fetches the instruction stored in the memory 122, the following steps may be performed: receiving a charging system switching request message, where the charging system switching request message includes a first identifier and a second identifier, the first identifier is used to indicate a service for which a charging system needs to be switched, and the second identifier is used to indicate a target charging system to which the service needs to be switched, determining, according to the first identifier, the service for which a charging system needs to be switched, and determining, according to the second identifier, the target charging system to which the service needs to be switched, and switching, from a current charging system to the target charging system, the service for which a charging system needs to be switched.

More detailed content of the corresponding steps performed when the processor 121 reads the instruction stored in the memory 122 has been described in FIG. 4 and the corresponding steps 401 to 403, and is not repeated herein again.

Using the access device disclosed in this embodiment, any service can be switched from an original charging system to a new charging system in real time, without switching all users on the original charging system onto the new charging system. In this way, smooth switching between multiple charging systems is supported, and in addition, multiple charging systems can perform charging for different services of a same user, thereby implementing coexistence of different charging systems.

An embodiment of the present disclosure provides a system for switching a charging system, where the system includes an OCS and an access device, or the system further includes a CRM system.

The OCS includes the OCS in the embodiment shown in FIG. 7 or FIG. 8, and detailed content is not repeated herein again.

The access device includes the access device in the embodiment shown in FIG. 11 or FIG. 12, and detailed content is not repeated herein again.

The CRM system includes the CRM system in the embodiment shown in FIG. 9 or FIG. 10, and detailed content is not repeated herein again.

A person of ordinary skill in the art may understand that in the several embodiments provided in the present application, the disclosed system, apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored as code in a computer-readable storage medium. The foregoing code is stored in a computer-readable storage medium and includes several instructions that are used by a processor or a hardware circuit to execute a part of or all steps of the method in each embodiment of the present disclosure. The storage medium may be any medium capable of storing program code, such as a high-capacity miniature removable storage disk having a universal serial bus interface without a physical drive, a removable hard disk, a read only memory (ROM), a random access memory (RAM), a magnetic disk, or a compact-disc read-only memory (CD-ROM).

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A charging system switching method, comprising:
   determining, by an online charging system (OCS), a service for which a charging system needs to be switched, and a target charging system to which the service needs to be switched;
   constructing, by the OCS, a re-authentication request external session message, wherein the re-authentication request external session message comprises a first identifier and a second identifier, wherein the first identifier is used to indicate the service for which the charging system needs to be switched, and wherein the second identifier is used to indicate the target charging system to which the service needs to be switched; and
   sending, by the OCS, the re-authentication request external session message to an access device in order to instruct the access device to switch the service from a current charging system to the target charging system according to the re-authentication request external session message,
   wherein determining, by the OCS, the service for which the charging system needs to be switched comprises:
      determining, by the OCS, a user for which the charging system needs to be switched; and
      determining the service that is of the user and for which the charging system needs to be switched, and
   wherein the first identifier is an identifier of the user when the OCS determines that the charging system needs to be switched for all services of the user.

2. The method according to claim 1, wherein the second identifier is an identifier of the OCS when no online charging session of the service exists between the OCS and the access device and when the OCS and the target charging system are a same charging system.

3. An online charging system (OCS), comprising:
   a transmitter; and
   a processor coupled to the transmitter and configured to:
      determine a service for which a charging system needs to be switched, and a target charging system to which the service needs to be switched; and
      construct a re-authentication request external session message on a basis that the service for which the charging system needs to be switched, and the target charging system to which the service needs to be switched, wherein the re-authentication request external session message comprises a first identifier and a second identifier, wherein the first identifier is used to indicate the service for which the charging system needs to be switched, wherein the second identifier is used to indicate the target charging system to which the service needs to be switched,
   wherein the transmitter is configured to send the re-authentication request external session message to an access device in order to instruct the access device to switch the service from a current charging system to the target charging system according to the re-authentication request external session message,
   wherein the processor is further configured to:
      determine a user for which the charging system needs to be switched; and
      determine the service that is of the user and for which the charging system needs to be switched, and
   wherein the first identifier is an identifier of the user when the charging system needs to be switched for ail services of the user.

4. A charging system switching method, comprising:
   determining, by a customer relationship management (CRM) system, a service for which a charging system needs to be switched, and a target charging system to which the service needs to be switched;
   constructing, by the CRM system, a charging system switching request message, wherein the charging system switching request message comprises a first identifier and a second identifier, wherein the first identifier is used to indicate the service for which the charging system needs to be switched, and wherein the second identifier is used to indicate the target charging system to which the service needs to be switched; and
   sending, by the CRM system, the charging system switching request message to an access device in order to instruct the access device to switch the service from a current charging system to the target charging system according to the charging system switching request message,
   wherein determining, by the CRM system, the service for which the charging system needs to be switched comprises:
      determining, by the CRM system, a user for which the charging system needs to be switched; and
      determining the service that is of the user and for which the charging system needs to be switched, and
   wherein the first identifier is an identifier of the user when the CRM system determines that the charging system needs to be switched for all services of the user.

5. A customer relationship management (CRM) system, comprising:

a transmitter; and a processor coupled to the transmitter and configured to:
  determine a service for which a charging system needs to be switched, and a target charging system to which the service needs to be switched; and
  construct a charging system switching request message on a basis that the service for which the charging system needs to be switched, and the target charging system to which the service needs to be switched, wherein the Charging system switching request message comprises a first identifier and a second identifier, wherein the first identifier is used to indicate the service for which the charging system needs to be switched, wherein the second identifier is used to indicate the target charging system to Which the service needs to be switched,
wherein the transmitter is configured to send the charging system switching request message to an access device in order to instruct the access device to switch the service from a current charging system to the target charging system according to the charging system switching request message,
wherein the processor is further configured to:
  determine a user for which the charging system needs to be switched; and
  determine the service that is of the user and for which the charging system needs to be switched, and
wherein the first identifier is an identifier of the user when the charging system needs to be switched for all services of the user.

6. A charging system switching method, comprising:
receiving, by an access device, a charging system switching request message, wherein the charging system switching request message comprises a first identifier and a second identifier, wherein the first identifier is used to indicate a service for which a charging system needs to be switched, and wherein the second identifier is used to indicate a target charging system to which the service needs to be switched;
determining, by the access device according to the first identifier, the service for which the charging system needs to be switched;
determining, by the access device according to the second identifier, the target charging system to which the service needs to be switched; and
switching, by the access device from a current charging system to the target charging system, the service for which the charging system needs to be switched,
wherein the first identifier comprises an identifier of a user, and
wherein determining, by the access device according to the first identifier, the service for which the charging system needs to be switched comprises:
  determining, by the access device, whether the first identifier further comprises an identifier of the service;
  determining, by the access device according to the identifier of the service, the service for which the charging system needs to be switched when the first identifier further comprises the identifier of the service; or
  determining, by the access device according to the identifier of the user, that all services of the user are services for which the charging system needs to be switched when the first identifier does not comprise the identifier of the service.

7. The method according to claim 6, wherein the charging system switching request message is a re-authentication request external session message received from an online charging system (OCS).

8. The method according to claim 7, wherein the second identifier comprises an identifier of the OCS.

9. The method according to claim 6, wherein the charging system switching request message is received from a customer relationship management (CRM) system.

10. The method according to claim 6, wherein switching, by the access device from the current charging system to the target charging system, the service for which the charging system needs to be switched comprises:
  terminating an online charging session of the service when the online charging session of the service exists between the access device and the current charging system; and
  establishing another online charging session of the service with the target charging system.

11. The method according to claim 10, wherein after terminating, by the access device, the online charging session of the service, the method further comprises keeping, by the access device, a network connection of the service.

12. An access device, comprising:
a processor; and
a receiver coupled to the processor and configured to receive a charging system switching request message, wherein the charging system switching request message comprises a first identifier and a second identifier, wherein the first identifier is used to indicate a service for which a charging system needs to be switched, wherein the second identifier is used to indicate a target charging system to which the service needs to be switched, and
wherein to the processor is configured to:
  determine, according to the first identifier, the service for which the charging system needs to be switched;
  determine, according to the second identifier, the target charging system to which the service needs to be switched; and
  switch, from a current charging system to the target charging system and according to the service and the target charging system that are determined, the service for which the charging system needs to be switched,
wherein the first identifier comprises an identifier of a user, and
wherein the processor is further configured to:
  determine whether the first identifier further comprises an identifier of the service;
  determine, according to the identifier of the service, the service for which the charging system needs to be switched when the first identifier further comprises the identifier of the service; and
  determine, according to the identifier of the user, that all services of the user are services for which the charging system needs to be switched when the first identifier does not comprise the identifier of the service.

13. The access device according to claim 12, wherein the charging system switching request message is a re-authentication request external session message sent by received from an online charging system (OCS), wherein the second identifier comprises an identifier of the OCS, and wherein the processor is further configured to:
  determine whether the second identifier further comprises an identifier of the target charging system;

determine, according to the identifier of the target charging system, the target charging system to which the service needs to be switched when the second identifier further comprises the identifier of the target charging system; and determine, according to the identifier of the OCS, that the target charging system to which the service needs to be switched is the OCS when the second identifier does not comprise the identifier of the target charging system.

14. The access device according to claim 12, wherein the processor is further configured to:

terminate an online charging session of the service when the online charging session of the service exists between the access device and the current charging system; and establish another online charging session of the service with the target charging system.

15. The access device according to claim 14, wherein the processor is further configured to keep a network connection of the service.

16. The access device according to claim 12, wherein the processor is configured to:

save a correspondence between the service and the target charging system when an online charging session of the service does not exist between the access device and the current charging system;

receive a connection request of the service; and send a charging request to the target charging system.

* * * * *

UNITED STATES PATENT AND TRADEMARK OFFICE
CERTIFICATE OF CORRECTION

PATENT NO. : 10,027,820 B2
APPLICATION NO. : 15/217524
DATED : July 17, 2018
INVENTOR(S) : Xiuyan Xia Page 1 of 1

It is certified that error appears in the above-identified patent and that said Letters Patent is hereby corrected as shown below:

On the Title Page

Item (30), Line 1: "201410037049" should be "201410037049.4"

In the Claims

Column 24, Line 34: "ail" should be "all"

Column 25, Line 10: "Charging" should be "charging"

Column 25, Line 15: "Which" should be "which"

Column 26, Line 62: delete "sent by"

Signed and Sealed this
Fourth Day of September, 2018

Andrei Iancu
*Director of the United States Patent and Trademark Office*